United States Patent [19]

Hay

[11] 3,746,412

[45] July 17, 1973

[54] SELF-ADJUSTING NUT ASSEMBLY FOR WHEEL RETAINMENT

[75] Inventor: Charles N. Hay, Sandusky, Ohio

[73] Assignee: General Motors Corporation, Detroit, Mich.

[22] Filed: July 6, 1971

[21] Appl. No.: 159,756

[52] U.S. Cl............................................. 308/207 A
[51] Int. Cl. ............................................. F16c 23/08
[58] Field of Search....................... 308/207.1, 189.1

[56] References Cited
UNITED STATES PATENTS
1,278,538  9/1918  Weston et al........................ 308/63
1,437,833  12/1922  Buckwalter..................... 308/207 A FOREIGN PATENTS OR APPLICATIONS
452,793  10/1926  Germany........................... 308/211

Primary Examiner—Charles J. Myhre
Assistant Examiner—Frank Susko
Attorney—J. L. Carpenter et al.

[57] ABSTRACT

A self-adjusting nut assembly used to adjust the race-bearing relationship in a vehicle front wheel assembly in order to eliminate radial and axial play between the hub and the spindle of the wheel assembly, the nut assembly comprising a nut having integral camming ramps on its inboard face which cooperate with similar camming ramps on an interior member slidably mounted on the wheel spindle, the interior member being maintained in assembly with the nut within a shroud with a coil spring secured to the nut and the interior member to produce the desired rotational movement between the nut and the interior member which results in these elements being spread apart.

3 Claims, 3 Drawing Figures

PATENTED JUL 17 1973  3,746,412

INVENTOR.
Charles N. Hay
BY
Arthur N. Krein
ATTORNEY

SELF-ADJUSTING NUT ASSEMBLY FOR WHEEL RETAINMENT

This invention relates to a self-adjusting nut assembly and specifically to a self-adjusting nut assembly for adjusting the race-bearing relationship in a wheel bearing assembly.

To obtain maximum performance of tapered bearings in conventional passenger car front wheel mountings and some rear wheel mountings, it is imperative that proper bearing adjusments be made after asssmbly of the bearings and wheel hub. In making these adjustments, a certain amount of judgment is required by the assembler as to how tightly to pull up the conventional wheel retaining nut against the bearings on the wheel spindle. In addition, during the manufacturing of the various components for such a conventional wheel assembly, proper engineering and machine standards must be met in order to permit proper bearing adjustment in such an assembly.

It is therefore the principal object of this invention to improve a nut assembly for use in a vehicle wheel assembly in which the race-bearing relationship in the wheel bearing assembly is automatically adjusted in order to eliminate radial and axial play between the hub and the spindle of the wheel mounting.

Another object of this invention is to provide a self-adjustment nut assembly for vehicle wheel retainment whereby the race-bearing relationship in the wheel bearing is properly and automatically adjusted by means of the self-adjusting nut assembly.

These and other objects of the invention are attained by means of a self-adjusting nut assembly comprising a nut having integral camming ramps on its inboard face which cooperate with similar camming ramps on the outboard face of an inner member, the nut being secured to the spindle on which it is used, with a housing or shroud enclosing a portion of the nut and the interior member, and with a coil spring secured to the nut and the interior member to bias the interior member rotationally with respect to the nut to urge the nut and interior member ramps apart to effect and maintain proper adjustment of the wheel bearings.

For a better understanding of the invention, as well as other objects and further features thereof, reference is had to the following detailed description of the invention to be read in connection with the accompanying drawings, wherein.

Figure 1:
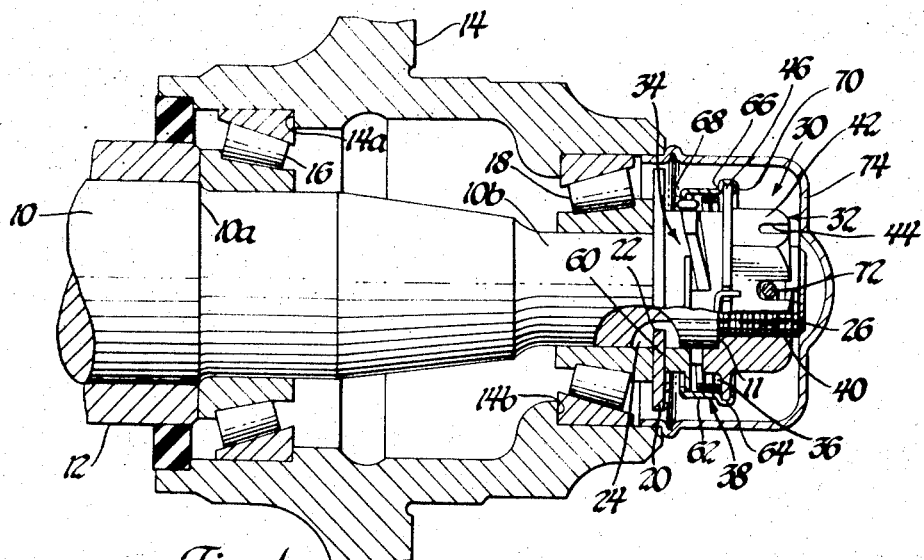
FIG. 1 is a sectional view of a portion of an automotive front wheel assembly incorporating a self-adjusting nut assembly constructed in accordance with the invention.

Although the self-adjusting nut assembly of the invention could be used with other forms of structures, it is shown in FIG. 1 as used on an automotive front wheel bearing, spindle and wheel assembly. Referring now to FIG. 1, a nonrotatively mounted shaft or wheel spindle 10 positioned by spindle support spacer 12 serves as a support for a wheel, the hub portion 14 of which is only shown in this figure. The hub 14 is rotatably mounted on the spindle 10 by means of a pair of opposed tapered inboard and outboard roller bearings 16 and 18, respectively. For proper operation of such an assembly, axial and radial play must be eliminated between the hub 14 and the spindle 10.

To effect this in part, as shown, the outer race of the bearing 16 abuts a shoulder 14a of the hub at its right-hand side while the inner race of this bearing abuts on its left-hand side, as seen in FIG. 1, a shoulder 10a on the spindle 10. In addition, the outer race of the bearing 18 abuts on its left-hand side, as seen in this figure, a shoulder 14b of the hub 14. By properly adjusting the axial position of the inner race of bearing 18 in abutment against a bearing retaining washer 20, axially slidably mounted on the reduced end of the spindle 10 and fixed against rotation thereon by engagement of the inward radial lug 22 of this washer into a suitable axial extending slot 24 provided in the spindle for this purpose, the radial and axial play between the hub 14 and the spindle 10 can be eliminated.

Now in accordance with the invention, there is provided a self-adjusting nut assembly which, when threaded to the end of the spindle, will automatically accomplish this adjustment of the axial position of the inner race of bearing 18.

Figure 2:
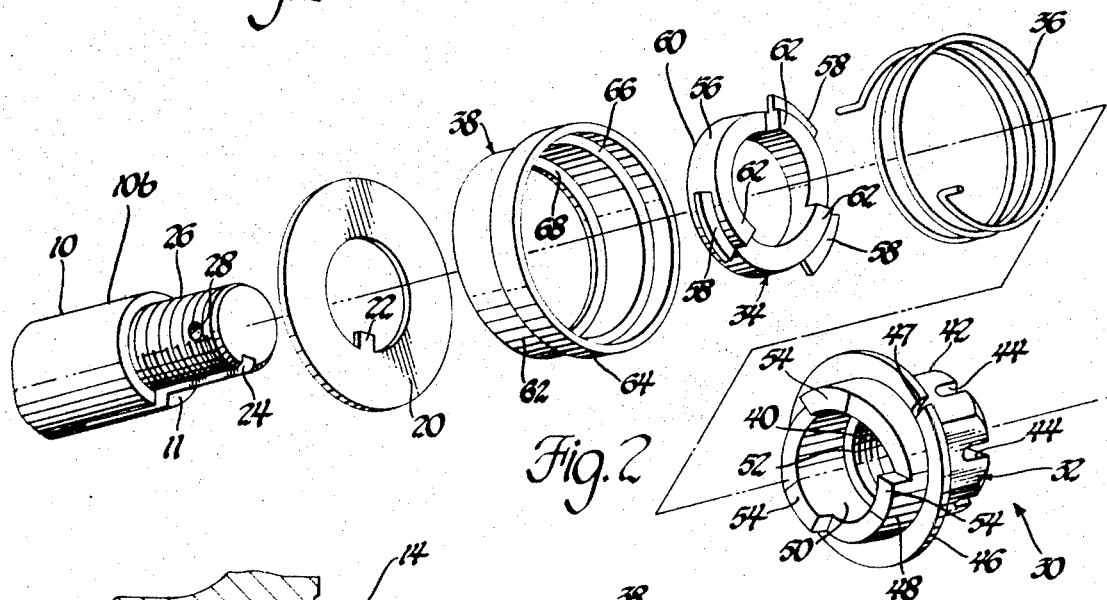
FIG. 2 is an exploded perspective view of the spindle and nut assembly of FIG. 1; and, FIG. 3 is a view similar to that of FIG. 1 but incorporating a second embodiment of the self-adjusting nut assembly of the invention.

For use with a wheel spindle, of the type shown in FIG. 1, having an abutment shoulder 11 between its threaded portion 26 and its reduced portion 10b supporting bearing 18, there is provided a self-adjusting nut assembly, generally designated 30, constructed in accordance with the embodiment illustrated in FIGS. 1 and 2. As shown in these figures, the nut assembly 30, consisting of four elements secured together to provide a unit-handled nut assembly, includes nut 32, an interior member 34, a coil spring 36 and a housing or shroud 38.

The nut 32, which may be die-cast, includes a castellated hex nut portion 42 with a plurality of slots 44 at the end thereof and with a threaded bore 40 therethrough, and an intermediate radially outward extending annular flange 46 and an end collar 48 with a bore 50 therein of a diameter slightly larger than the outside diameter of the reduced portion 10b of the spindle, the threaded bore 40 and the bore 50 meeting coaxially with a shoulder 52 therebetween. The free end or left-hand end of the collar 48, as seen in FIG. 1, which is the inboard end of nut 32, incudes in the embodiment shown three camming ramps or cam surfaces 54 for a purpose to be described.

The interior member 34, in the form of a ring face cam, includes an annular collar 56, slidably receivable on the reduced portion 10b of spindle 10, provided with a plurality of circumferentially spaced radially outward extending lobes 58. The inboard or left-hand end surface 60 of collar 56, as seen in FIG. 1, is plain or flat for abutment against the bearing retaining washer 20 while the opposite end or outboard end is provided with camming ramps or cam surfaces 62 for cooperation with the matching ramps or cam surfaces 54 of nut 32 to effect and maintain axial displacement of the interior member 34 relative to the nut 32 in a manner to be described.

A coil spring 36 is used to normally rotatively bias the interior member 34 in a direction relative to the nut 32 to cause rotational motion of the interior member 34 with respect to the nut 32 in an up-ramp direction to cause maximum axial extension of these elements with respect to each other within the limits permitted by the housing or shroud 38, as described hereinafter. The coil spring 36, which is placed in tension before assembly, is mounted to encircle the collar 48 of nut 32 and a portion of the interior member 34 with one end of the spring engaged in a suitable slot 47 in the flange 46 of nut 32 and the opposite end of the spring is engaged against a lobe 58 of interior member 34 to normally bias the interior member 34, in the embodiment disclosed, in an up-ramp or clockwise direction as indicated by the arrow in FIG. 2, with respect to the nut 32.

It can be seen from the foregoing that relative rotation of interior member 34 with respect to nut 32 in the opposite direction will result in down-ramp movement thus shortening the axial extension of these elements. In addition, the angle of the ramps or cam surfaces 54 and 62 on these elements are so selected that these elements will frictionally lock against any axial force applied against these elements in a direction which would otherwise shorten their axial extension.

To provide for unit-handling of the nut 32, interior member 34 and spring 36, and to limit the axial movement between the nut 32 and the interior member 34, these elements are enclosed and retained loosely in assembled proper relationship with respect to each other by means of a housing or shroud 38. The housing or shroud 38, as seen in the unassembled view in FIG. 2, is in the form of a sheet metal stepped tube having tubular portions 62 and 64 joined together by a radial shoulder 66. The free end of the tubular portion 62 is partially closed by a radially inward extending annular flange 68, the inner diameter of which is less than the outer diameter of the lobes 58 of the interior member 34.

In assembly, the interior member 34, the pre-tensioned spring 36 and the nut 32 are inserted into the shroud 38 through its tubular portion 64 and then an end portion of the tubular portion 64 is crimped over the annular flange 46 of nut 32 to provide an outboard retaining flange 70, as shown in FIG. 1. The axial length of the shroud between the flanges 68 and 70 is such so as to prevent full size or up-camming of the cam surfaces on the nut 32 and the interior member 34 with respect to each other to prevent unwinding of the previously pre-tensioned coil spring 36. With this arrangement, the axial extension of the interior member 34 with respect to nut 32 is limited as defined by the limitations permitted by the crimped housing or shroud 38.

In final assembly to the wheel assembly, as shown in FIG. 1, the nut assembly 30 is screwed onto the spindle 10 by means of the threaded bore 40 of nut 32 engaging the threaded portion 26, until the shoulder 52 in nut 32 engages the shoulder 11 on the spindle. The design of the wheel assembly and nut assembly is such that before the nut 32 is seated against the shoulder 11 on spindle 10, the plain face surface 60 of the interior member 34 contacts the bearing retaining washer 20 somewhere within the tolerance build-up range of the spindle, bearings and hub assembly. When this occurs, the frictional force between the bearing retaining washer 20 and interior member 34 stops the latter from turning so that further rotation of the nut 32 causes relative rotation between it and the interior member allowing down-ramp movement and axial shortening of these elements until the nut seats against the shoulder 11 of spindle 10.

Thus, when threading the nut assembly onto the spindle, the bearing retaining washer 20 first moves into abutment with the inner race of bearing 18 and takes up stack-up tolerances of the wheel bearings and spindle assembly. When these stack-up tolerances have been eliminated, the frictional forces between the interior member 34 and the bearing retainer 20 will prevent further rotational movement of the interior member, so that further rotation of the nut 32, until it engages the shoulder 11, will cause relative rotation between the nut 32 and interior member 34 allowing down-ramp movement between these two elements. That is, the ramp surfaces 54 and 62 slip with respect to each other, thus decreasing the axial dimension across these elements until the nut 32 sets against the spindle shoulder 11. After this, the nut 32 is merely backed off, if necessary, to expose a hole 28 in the spindle so that a cotter pin 72 can be inserted through a slot 44 in the castellated end of the nut 32 and into this hole whereby the nut 32 is fixed against further rotation on the spindle 10.

The ramp angles of ramps 54 and 62, previously described, produce sufficient friction to prevent axial thrust from the inner race of bearing 18 to produce down-ramp slippage and a further decrease in the axial length across nut 32 and interior member 34. Thus, in application, it is only necessary to apply the nut assembly 30 to the wheel spindle 10, draw the nut 32 up against the spindle shoulder 11 and then back it off to expose hole 26 for cotter pin 72 insertion therein for safety. No other adjustment is necessary. The cover 74 is then secured to the hub 14 to finish the wheel assembly.

Figure 3:
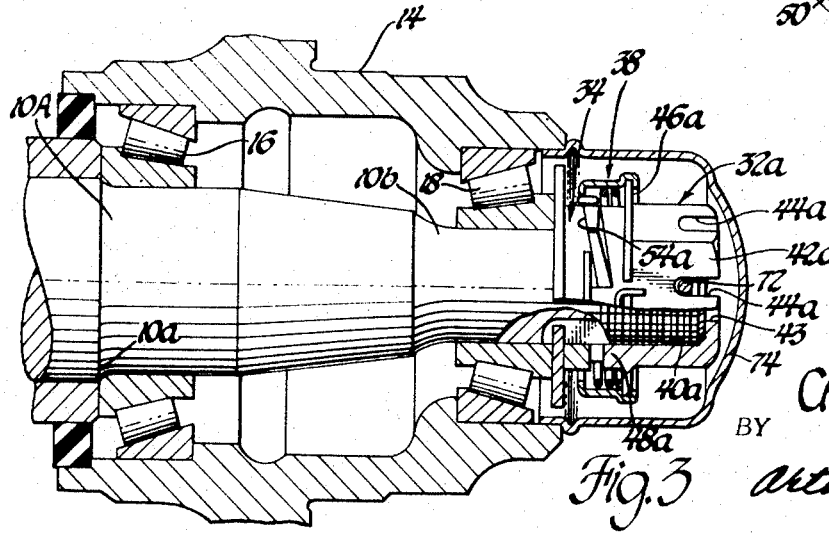

When a standard unshouldered wheel spindle 10A, as shown in FIG. 3, is used in the wheel assembly, a modified nut is required for use in the self-adjusting nut assembly of the invention. Such a modified nut 32a is shown in the embodiment illustrated in FIG. 3 wherein identical parts are identified by the same reference characters used to identify these parts in FIGS. 1 and 2.

In this embodiment, the nut 32a includes a castellated hex nut portion 42a partly closed at its free or right-hand end as seen in this figure by a radially inward extending annular flange 43, a plurality of slots 44a being provided in the free end of this nut portion, and intermediate radially outward extending annular flange 46a and an end collar 48a, the free end or left-hand end of the collar being provided with camming ramps or cam surfaces 54a which work in conjunction with the interior member 34 having matching ramps 62 on one face thereof, as previously described. The nut 32a is provided with a threaded counterbore 40a extending therethrough to the flange 43.

The remaining components of the nut assembly shown in FIG. 3 are identical to the components shown in the nut assembly illustrated in FIGS. 1 and 2, except for the use of the nut 32a just described. The nut assembly of FIG. 3 is assembled to the wheel spindle 10a of the type shown in FIG. 3 in the same manner as previously described except that in this case, the nut 32a is threaded onto the spindle until it bottoms on the free end, or right-hand end, of the spindle as shown in FIG. 3.

Thus, in assembling either embodiment of the self-adjusting nut assembly of the invention to a wheel assembly, the assembler need merely to tighten down the nut, either nut 32 or 32a, until it bottoms out on the spindle shaft and then he inserts a cotter pin, backing out the nut, if necessary, to uncover the cotter pin hole in the wheel spindle, and the tolerance stack-up of the wheel assembly is automatically eliminated.

What is claimed is:

1. In a wheel assembly having a nonrotatable spindle threaded at its outboard end, an inboard bearing means and an outboard bearing means mounted on said spindle, a wheel hub rotatably supported on said spindle by said bearings, a thrust retaining washer slidably positioned on said spindle for abutment against said outboard bearing means and a self-adjusting nut assembly threaded to said spindle for adjusting the axial position of said outboard bearing on said spindle, said self-adjusting nut assembly comprising an interior member in the form of a cam faced collar slidably and rotatably mountable on said spindle, a nut means threadingly engagable on said spindle outboard of said interior member, said nut means including an annular retaining means positioned to engage a portion of said spindle to limit the axial position of said nut means on said spindle, said nut means having cam surfaces adapted to cooperate with said cam faced collar of said interior member, spring means partially encircling said interior member and said nut means with one end of said spring engaging said interior member and the opposite end of said spring engaging said nut means to normally rotatively bias said interior member relative to said nut means in an up-cam-ramp direction and, shroud means loosely encircling said interior member, said spring and said nut means with means on said shroud to engage said interior member and said nut means to limit the axial separation of said nut means relative to said interior member.

2. In a wheel assembly according to claim 1 wherein said nonrotatable spindle is provided with a shoulder adjacent its outboard threaded end, and wherein said nut means of said self-adjusting nut assembly is provided with a stepped bore to form an internal shoulder defining said annular retaining means for abutment against said shoulder on said spindle.

3. In a wheel assembly according to claim 1 wherein said nut means of said self-adjusting nut assembly is provided with a radially inward extending annular flange at is outboard end defining said annular retaining means and adapted to abut against the outboard threaded end of said spindle.

* * * * *